United States Patent [19]
Parkin et al.

[11] Patent Number: 5,512,900
[45] Date of Patent: Apr. 30, 1996

[54] AIRCRAFT LANDING SYSTEMS

[75] Inventors: David Parkin, Seaview; John D. Sole, Newport, both of England

[73] Assignee: Siemens Plessey Electronic Systems Limited, Chessington, England

[21] Appl. No.: 293,193

[22] Filed: Aug. 19, 1994

[30] Foreign Application Priority Data

Sep. 28, 1993 [GB] United Kingdom .................. 9319993

[51] Int. Cl.$^6$ ..................................................... G01S 7/40
[52] U.S. Cl. ............................... 342/35; 342/39; 342/174
[58] Field of Search ................................ 342/35, 33, 39, 342/173, 174

[56] References Cited

U.S. PATENT DOCUMENTS

| | | | |
|---|---|---|---|
| 4,647,926 | 3/1987 | Devensky et al. | 342/7 |
| 4,757,316 | 7/1988 | Brault et al. | 342/173 |
| 4,823,127 | 4/1989 | Roelofs et al. | 342/35 |
| 4,916,451 | 4/1990 | Ishita | 342/35 |

FOREIGN PATENT DOCUMENTS

| | | |
|---|---|---|
| 2052911A | 1/1981 | United Kingdom . |
| 2194407A | 3/1988 | United Kingdom . |
| 2203915A | 10/1988 | United Kingdom . |
| WO9110917 | 7/1991 | WIPO . |

Primary Examiner—John B. Sotomayor
Attorney, Agent, or Firm—Keck, Mahin & Cate

[57] ABSTRACT

An MLS system comprising ground based equipment which includes a microwave signal transmitter arranged to feed microwave signals to radiator elements of an array antenna via phase shifter modules one of which is provided for each of the said elements, whereby the production of a scanned microwave signal beam is facilitated, signal monitor/detector means effective to provide a detected sample signal derived from the scanned beam, filter means responsive to the detected sample signals for providing a filtered signal derived in dependence upon effective sidelobe signals in the said beam, and comparator means responsive to the filtered signal for providing a transmitter shutdown signal when the filtered signal exceeds a predetermined threshold level for more than a predetermined time during a predetermined number of successive scans.

9 Claims, 10 Drawing Sheets

AIRCRAFT LANDING SYSTEMS

FIELD OF THE INVENTION

This invention relates to aircraft landing systems and more especially it relates to scanning beam MLS (Microwave Landing Systems).

DESCRIPTION OF THE RELATED ART

As is well known to those skilled in the art, MLS systems comprise two ground based beam scanning equipments one of which scans in elevation and the other of which scans in azimuth, aircraft guidance information being derived by an airborne receiver responsive to the scanned beams. One of the problems associated with MLS is that the beams from which the airborne receiver derives guidance can be affected by a combination of MLS ground equipment errors and multipath effects dependent on the local terrain.

This problem stems from the fact that MLS scanning beam antennas produce a main beam and associated sidelobes. The scanning beam sidelobes are distributed throughout the space in front of the MLS ground based equipment and illuminate any multipath reflectors. The multipath reflectors in the case of the azimuth ground equipment, can be buildings or elevated terrain (hills) etc., and may, or may not, be present at a particular aerodrome runway location. The multipath reflector in the case of the elevation equipment, is the ground and is therefore always present at any location.

The MLS regulatory authorities (ICAO, Eurocae, FAA, CAA) specify a maximum limit on guidance error caused by the effect of sidelobes reflected into the scanning beam by multipath reflectors. They also specify that the MLS ground based equipment shall shut itself down if the maximum specified guidance error due to the effect of sidelobes and multipath is exceeded. The MLS ground based equipment for elevation or for azimuth comprises a phased array which is necessary to achieve the high scan rate required. Each element of the phased array must contain as a minimum, an electronic phase shifter. Failures of individual array phase shifters cause the MLS array antenna sidelobes to degrade and hence increase the effect of the sidelobes on guidance via any multipath reflector.

It is therefore necessary to monitor in MLS ground based equipment, the effects of sidelobes due to phase shifter module failure via the multipath on guidance, and shutdown the MLS ground equipment when guidance due to this effect is out of allowed tolerance. Furthermore, the monitoring mechanism should shutdown the equipment only when erroneous guidance due to sidelobes is possible, and not at any other time, ie. without false alarms.

One known proposed method of monitoring the effect of sidelobes, due to array phase shifter failures, which cause the greatest increase in sidelobe level, is to have built in test (BIT) within each phase shifter module and decide whether or not to shutoff the equipment based on the degree and type of failure and its position in the antenna array. This method requires BIT within a large number of modules which is expensive and additionally the decision making process requires software which is not permitted within certain safety critical functions of MLS because its integrity cannot be quantified.

An alternative known proposed method is to measure the sidelobes of the scanning beam array directly, and to shutdown the system when they reach a level which could cause false guidance in the specified multipath conditions. The sidelobes could be measured using a field monitor which serves to sample the sidelobes transmitted by the ground based equipment or by an integral waveguide monitor which produces a similar sidelobe measurement. The sidelobe level at which the monitor goes into alarm mode and shuts down the MLS ground equipment would have to be that level which could possibly cause false guidance.

This method of monitoring the effect of sidelobes on guidance, in its simple form as described above, is a problem in that it will not satisfy continuity of serve and mean time to category downgrade requirements. This problem resides in the effect of phase shifter module failures on the monitored sidelobes and their effect on guidance.

On the one hand, phase shifter failures in the centre of the MLS array cause the largest increase in monitored sidelobes but no increase in guidance error through the multipath. On the other hand however, phase shifter failures approximately half way along from the array centre (depending on array amplitude distribution) cause the maximum effect on guidance through the multipath but cause the monitored sidelobes to increase by only half the amount caused by phase shifter failure at the array centre. Therefore simply using the sidelobes as a method of detecting false guidance due to effective sidelobes via the multipath will cause the MLS ground based equipment to go into alarm mode and shutdown unnecessarily if the phase shifter module failures are at the centre of the array, ie. a false alarm.

SUMMARY OF THE INVENTION

It is therefore an object of the present invention to provide an improved monitoring system which will shutdown the MLS transmitter only when array failures result in an unacceptable degradation of operational performance.

According to the present invention an MLS system comprises ground based equipment which includes a microwave signal transmitter arranged to feed microwave signals to radiator elements of an array antenna via phase shifter modules one of which is provided for each of the said elements, whereby the production of a scanned microwave signal beam is facilitated, signal monitor/detector means effective to provide a detected sample signal derived from the scanned beam, filter means responsive to the detected sample signals for providing a filtered signal derived in dependence upon effective sidelobe signals in the said beam, and comparator means responsive to the filtered signal for providing a transmitter shutdown signal when the filtered signal exceeds a predetermined threshold level for more than a predetermined time during a predetermined number of successive scans.

Thus, as will hereinafter be more fully explained, although the filtered signal is derived from sidelobes it is in effect weighted in accordance with their effect on guidance via multipath. In this way false alarms are eliminated and the system is arranged to be tolerant of phase shifter failures which might otherwise occasion system downgrade to a lower reliability category; or even unnecessary transmitter shutdown.

The signal monitor means may comprise a signal monitor, a phase reference signal generator, and a phase sensitive detector, the phase sensitive detector being responsive to a phase reference signal provided by the said generator and to a sample signal provided by the signal monitor for supplying the said detected sample signal.

the filter means may comprise a differential amplifier having two input ports and a delay device, which delay device provides a delay corresponding to a period required for the said beam to scan through a sector corresponding to one beam width, the differential amplifier being fed at one port thereof with the detected signal sample direct and being fed at the other port thereof via the delay device with the detected sample signal.

Alternatively the filter means may comprise a capacitor/resistor differentiator circuit.

The comparator means may comprise a first comparator, peak signal detector means responsive to the detected sample signal for providing a threshold reference level signal which defines the said threshold reference level, a counter, and a clock pulse generator, the counter being triggered by the said first comparator to count pulses from the said generator during periods when a signal derived by the peak signal detector means exceeds the threshold reference level signal, the count being aggregated during the said predetermined number of successive scans, and the transmitter shutdown signal being produced consequent upon the aggregated count exceeded a predetermined alarm level count.

The first comparator may be coupled to the counter via gate means operable in dependence upon the scanned beam position for inhibiting signals derived from the main beam and passing signals derived from the sidelobes.

The peak signal detector means may include a peak beam detector which is responsive to the detected sample signal and which is arranged to feed one port of a two port sample and hold circuit and one port of a two port second comparator, the other port of which second comparator is fed from the peak beam detector via the sample and hold circuit to provide at the output of the second comparator a feedback signal which is fed to the other port of the sample and hold circuit so as to provide the threshold reference level signal.

The comparator means may comprise a third comparator responsive to the count state of the counter for providing the transmitter shutdown signal when the said count state exceeds the said alarm level count.

The said ground based equipment may be used for the purposes of providing a beam which scans in azimuth and similar equipment may be provided which produces a beam which scans in elevation.

BRIEF DESCRIPTION OF THE DRAWINGS

One embodiment of the invention will now be described by way of example only with reference to the accompanying drawings, in which.

DETAILED DESCRIPTION OF THE INVENTION

Figure 1:
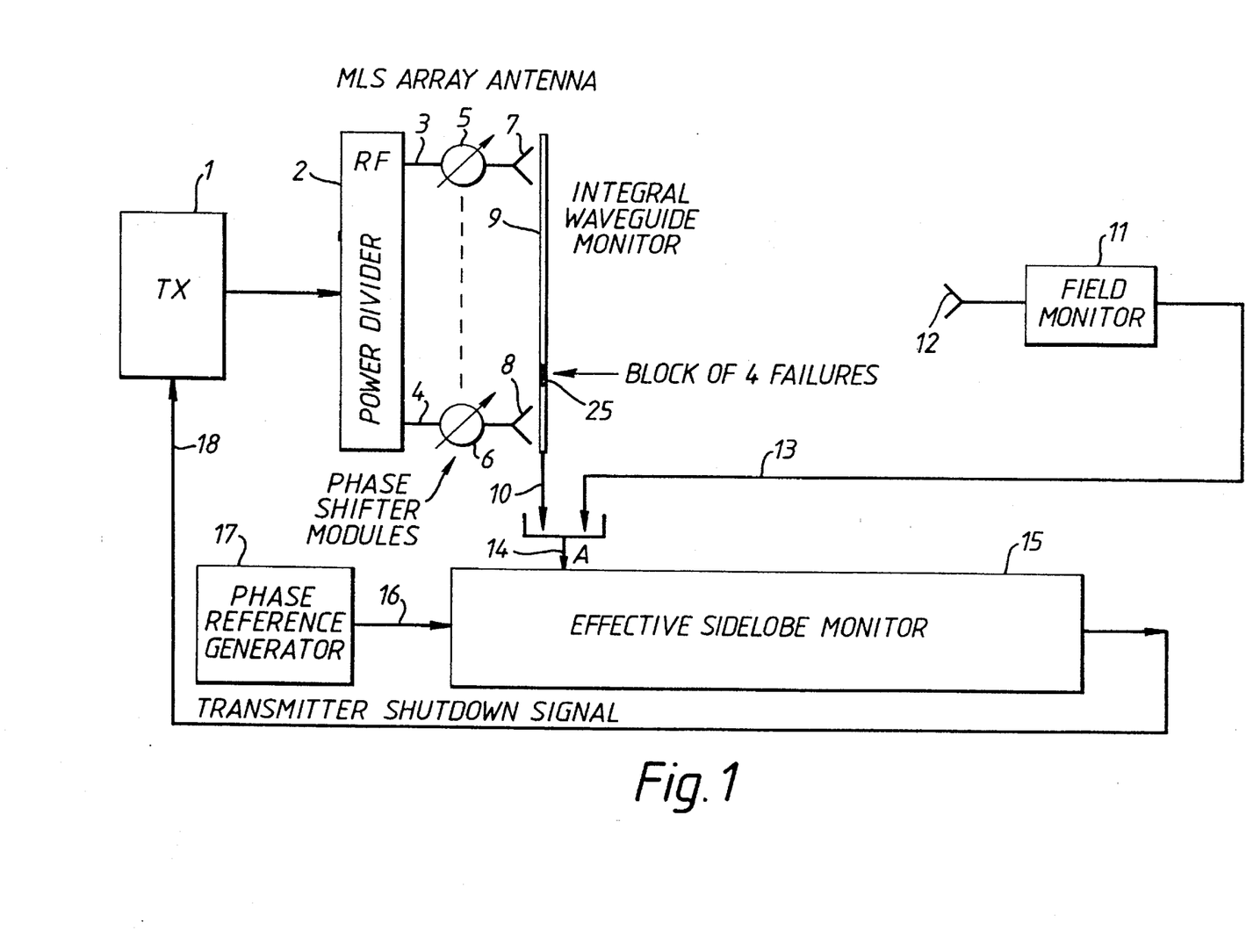
FIG. 1 is a generally schematic block diagram of a part of an MLS ground based equipment used to produce a scanned beam signal.

Referring now to FIG. 1, MLS ground based equipment for producing a scanning microwave beam (used either for azimuth or elevation) comprises a transmitter 1 which is arranged to feed an RF power divider 2, which provides a plurality of output lines only two of which 3 and 4 are shown arranged to feed phase shift modules 5 and 6 respectively. The phase shift modules are arranged to feed a plurality of radiator elements such as the elements 7 and 8 which are arranged to define a linear array antenna 9. In operation of the antenna the radiator elements which define the array are energised to produce a beam the shape and direction of which is determined in dependence upon the setting of the phase shifter modules such as the modules 5 and 6. In a practical implementation of the equipment the phase shift modules are controlled to produce a beam which scans alternately TO and FRO at a speed of 20,000 degrees per second. In equipment used to produce a scanned beam in elevation, the beam width is arranged to be nominally 1.5 degrees and the corresponding beam width for azimuth scans is arranged to be nominally 2 degrees. The construction of the equipment and specification required is laid down by the regulatory authorities as well known to those skilled in the art and accordingly will not be discussed here in any great detail.

In order to provide a sample of the scanned signal, samples from the array on a line 10 are taken, or alternatively, a field monitor apparatus 11 having a receiving antenna 12 is used which provides a similar sample signal on a line 13. Although both of the lines 10, 13, are shown in the drawing, (by way of example) it will be apparent that only one of the lines is used in practice. The manner in which signal samples are produced is not important and further discussion is therefore believed to be unnecessary. Signal samples derived either via line 10 or line 13 are fed via a line 14 to an effective sidelobe monitor 15 which utilises a signal on a line 16 from a phase reference generator 17 to provide an output signal on a line 18 when the effective sidelobes monitored are unacceptable and this initiates shutdown of the transmitter 1.

It should be emphasised that the monitor 15 does not merely monitor the sidelobe level but measures the level of effective sidelobes and shuts the transmitter down as appropriate in dependence upon this measurement.

Figure 2:
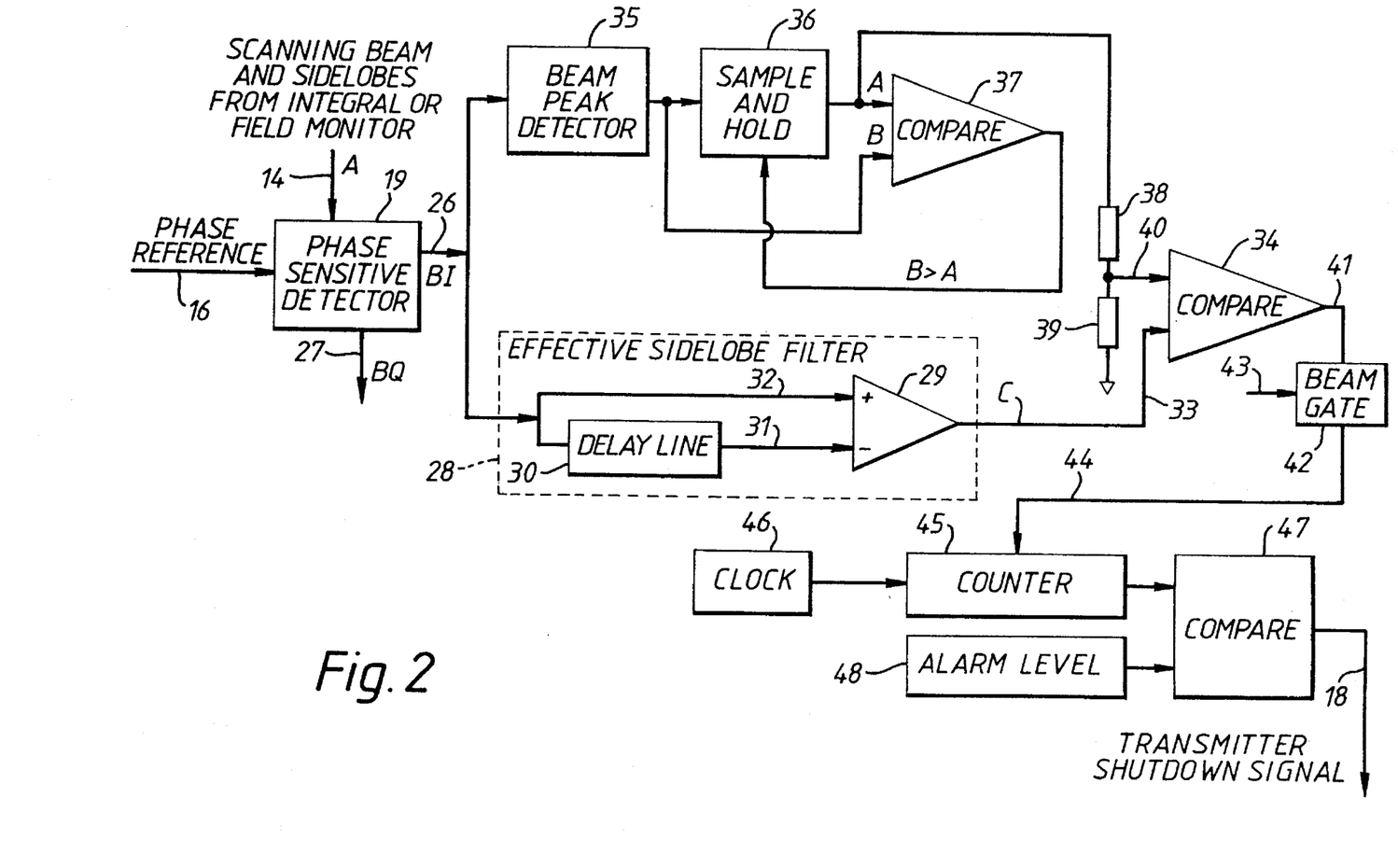
FIG. 2 is a generally schematic block diagram of a part of the equipment shown in FIG. 1.
Figure 5:
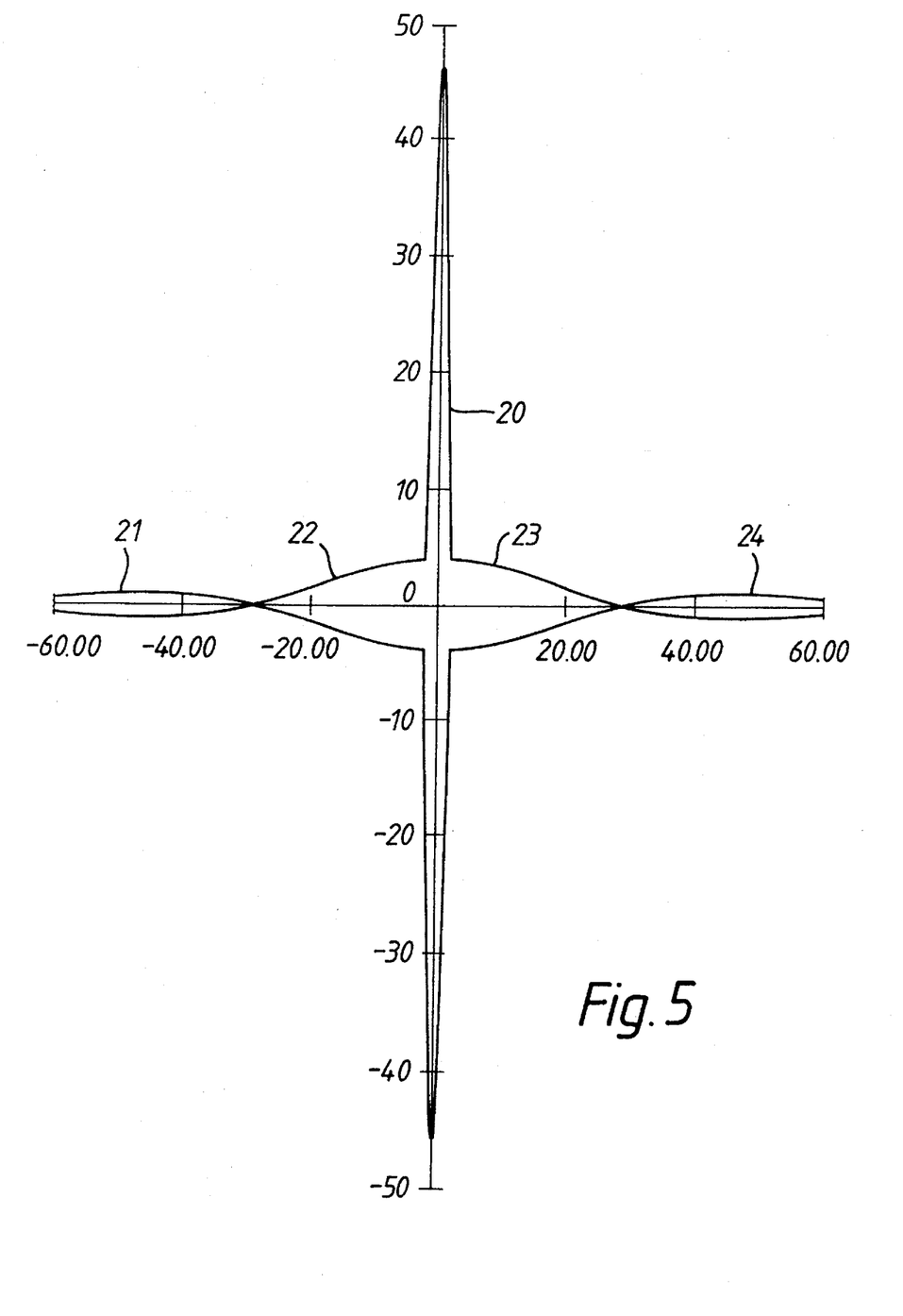
FIG. 5 is a waveform diagram illustrating the waveform to be expected at A in FIG. 2.

The construction of the effective sidelobe monitor 15 will now be described with reference to FIG. 2 wherein parts corresponding to those shown in FIG. 1 bear the same numerical designations. Referring now to FIG. 2, the effective sidelobe monitor 15 comprises a phase sensitive detector 19 which is fed with the phase reference generator signal on the line 16 and with the sidelobe sample signal on the line 14. The waveform to be expected at this point is as shown in FIG. 5, which is a 5 GHz RF signal envelope as might be seen on an oscilloscope at this point. It will be appreciated that the actual 5 GHz RF signal would be a blur and that the envelope only would be discernible. It will also be appreciated that the waveform is shown as a function of time as the beam is scanned from −60 degrees to +60 degrees with uniform angular velocity of 20 degrees per millisecond and thus the horizontal axis which corresponds to the scan angle is also a function of time. A field or integral monitor producing signals on lines 10, 13 is arranged to monitor the array normal, ie. the scan angle equals 0 degrees azimuth, hence the beam appears at this angle in FIG. 5. Thus at this angle a main beam 20 is shown with sidelobes 21, 22, 23 and 24 which are due to the failure of phase shift modules associated with a block of four radiator elements 25 shown schematically in FIG. 1.

The phase sensitive detector provides I and Q signals on lines 26 and 27 respectively and although as shown in FIG. 2 the I signal is used in this example either of these signals could be used for subsequent processing.

Figure 6:
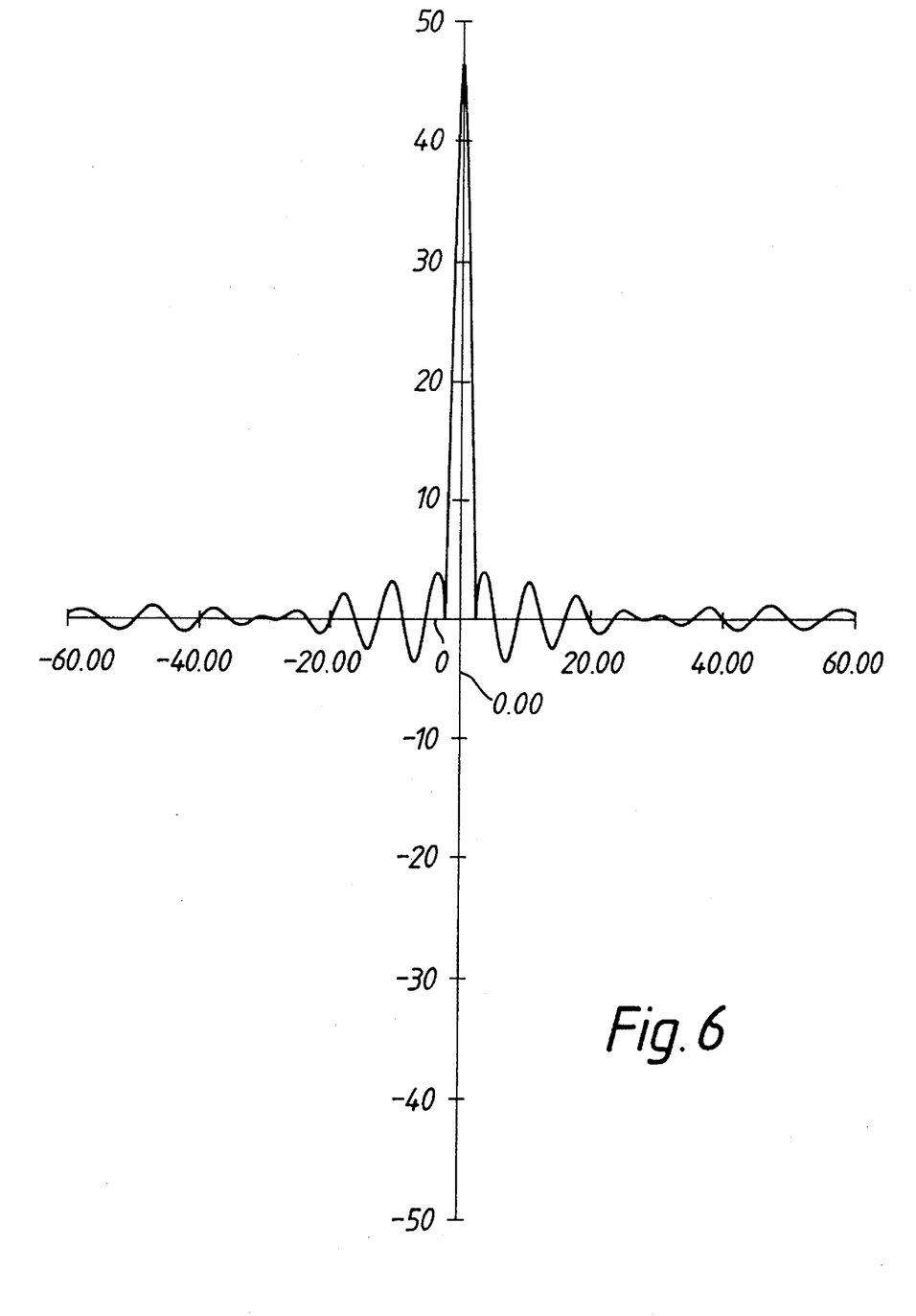
FIG. 6 is a waveform diagram showing the waveform to be expected at BI in FIG. 2.
Figure 7:
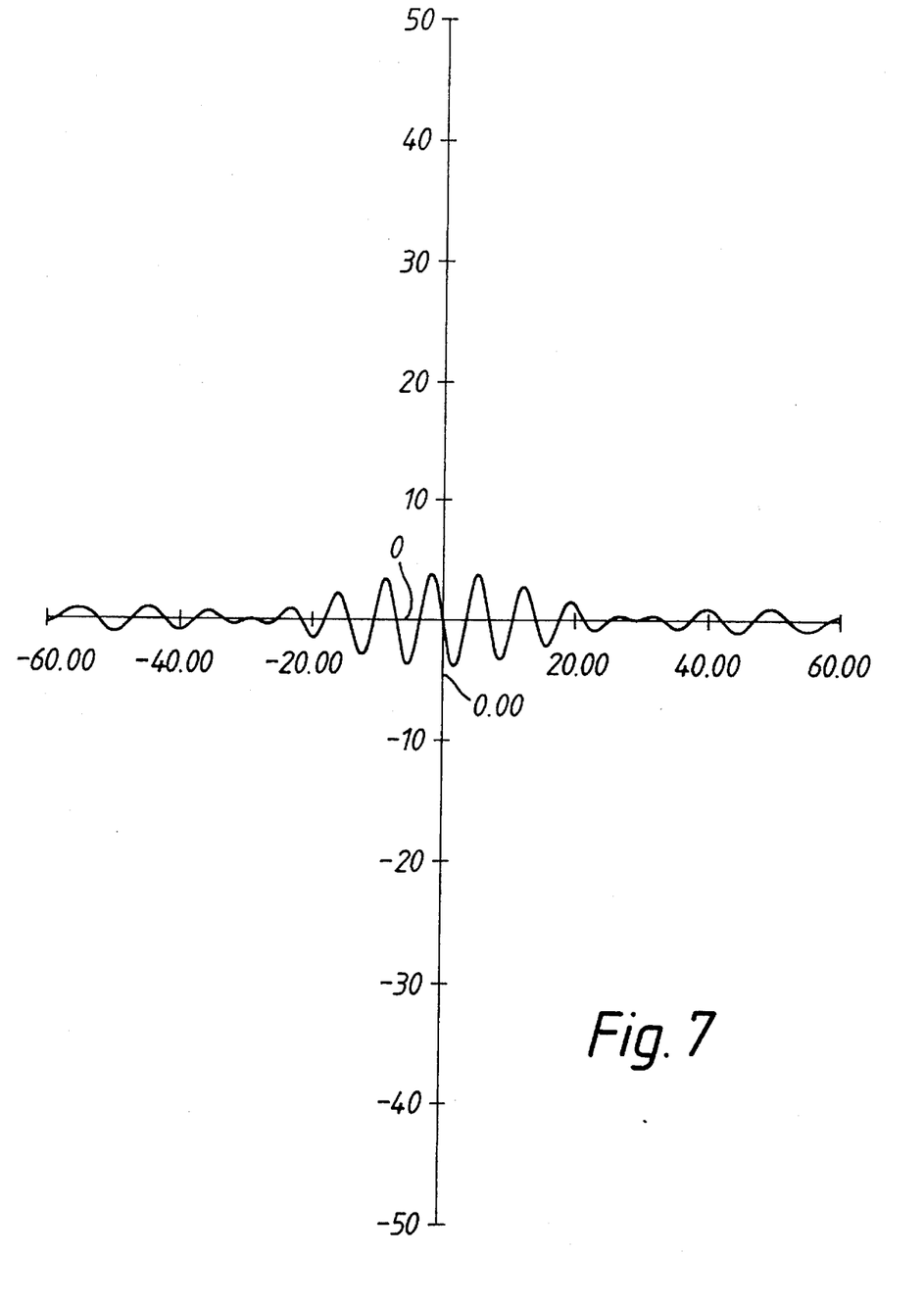
FIG. 7 is a waveform diagram showing the waveform to be expected at BQ shown in FIG. 2.
Figure 8:
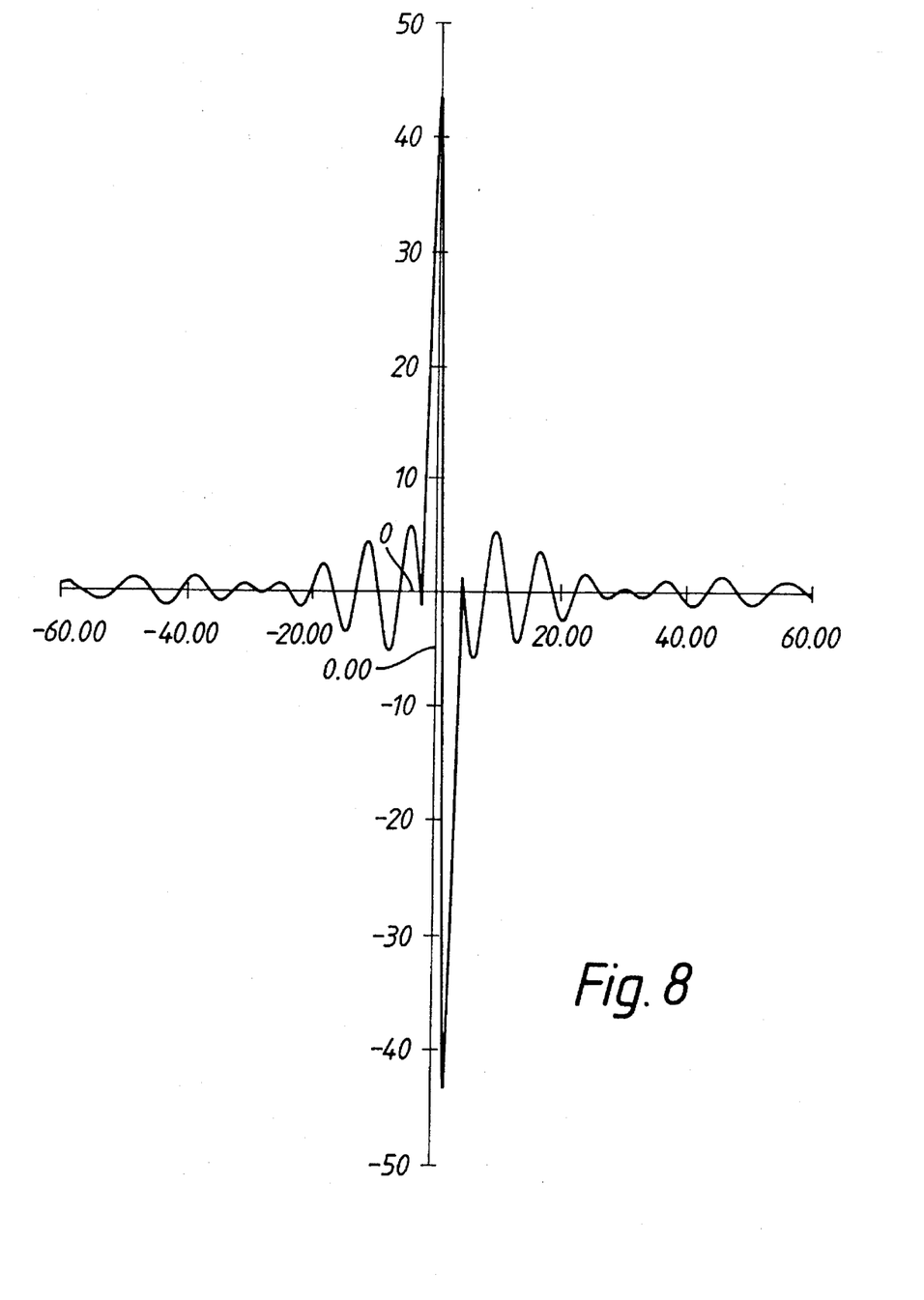
FIG. 8 is a waveform diagram showing a waveform to be expected at C in FIG. 2.
Figure 9:
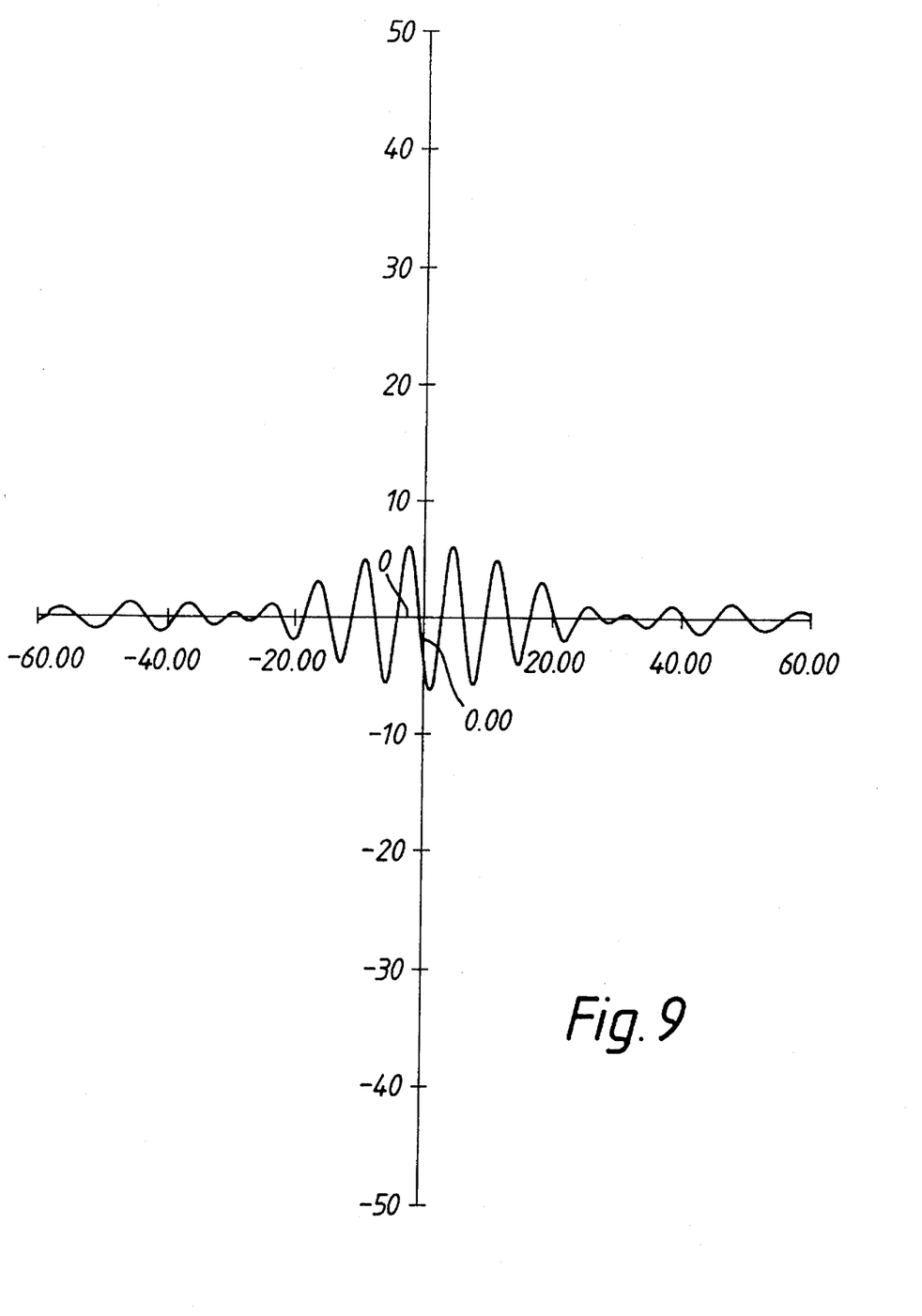
FIG. 9 is a waveform diagram showing an alternative waveform to be expected at point C in FIG. 2.

The signal to be expected on the line 26 designated BI is shown in FIG. 6. And the corresponding signal on the line 27 designated BQ is shown in FIG. 7. It will be appreciated that the BI signal shown in FIG. 6 is produced when the antenna phase cycling makes the beam phase the same as the phase of the phase reference signal on the line 16 and hence the beam is a maximum at the BI output. The phase of sidelobes as shown in FIG. 6, which are due to the radiator element failures 25 as shown in FIG. 1, vary as the beam is scanning, the rate of change of sidelobe phase being proportional to the distance of the failures 25 from the array centre and therefore the output signal from the phase sensitive detector 19 on the line 26 as shown by the waveform BI is an amplitude modulated frequency. The amplitude modulation is the RF sidelobe envelope as shown in FIG. 5. The signal on the line 26 is fed to a sidelobe filter as shown within broken line 28 which in this example comprises a differential amplifier 29 and a delay line 30. The delay line is arranged to provide a time delay which corresponds to the time taken for the scanning beam to scan one beam width, which with the beam widths and scanning rates specified is 75 microseconds for elevation equipment and 100 microseconds for azimuth equipment. The differential amplifier 29 is fed via the delay line 30 on a line 31 and directly on a line 32 from the phase sensitive detector 19. The output signal at a point C on a line 33 from the differential amplifier 29 is as illustrated in FIG. 8 when the antenna phase cycling causes the phase sensitive detector 19 output to correspond to the waveform shown in FIG. 6. When the waveform on the line 26 from the phase sensitive detector 19 corresponds to the waveform shown in FIG. 7, a waveform corresponding to the waveform shown in FIG. 9 will obtain at point C which is the line 33.

What should be appreciated is that if the four failures 25 as shown in FIG. 1 had been in the centre of the array, the frequency of the sidelobe signal output from the phase sensitive detector 19, BI on the line 26, would have been zero but its amplitude would have been twice as large. Consequently four failures in the centre of the array would cause no output at the effective sidelobe filter on the line 33 and this is precisely the condition required because failures in the centre of the array thus do not cause MLS guidance errors via multipath reflectors.

The signal on the line 33 is fed to one port of a two port comparator 34 the other port of which is fed from a beam peak detector 35 via a sample and hold circuit 36 a comparator 37 and a potentiometer comprising resistors 38 and 39. An output signal from the potentiometer 38, 39 on a line 40 is thus fed to the comparator 34 to serve as an amplitude reference against which the signal on the line 33 is compared.

The circuit for providing the reference on the line 40 includes the sample and hold circuit 36 because the peak beam signal detected in a given scan will not, in general, be the largest beam peak to occur during an antenna array phase cycle. The peak sensed during each scan is therefore sampled and held by the sample and hold circuit 36, the output of the sample and hold circuit being compared with the latest beam peak and if the latest beam peak is larger than the currently held value then the new larger value is sampled and held.

Output signals from the comparator 34 are fed via a line 41 to a beam gate 42 and a signal is fed to the beam gate 42 on a line 43 so that the gate 42 serves to inhibit the main beam 20 which is shown in FIG. 5 and pass signals derived from the sidelobes 21, 22, 23 and 24. The signal on the line 43 is derived from apparatus not shown which apparatus may also be used to control operation of the phase shifter modules 5, 6. Beam steering systems for control of such phase shifter modules 5, 6 are well known and detailed description herein is believed to be unnecessary.

Gated filtered signals on a line 44 from the beam gate 42 are fed to initiate operation of a counter 45 which in the presence of a signal on the line 44 starts to count pulses from a clock pulse generator 46. The count registered by the counter 45 is compared in a comparator 47 with an alarm level count as stored in an alarm level count store 48 and when the alarm level count is exceeded a transmitter shutdown signal is provided on the line 18. The counter is thus started when the signal on the line 33 exceeds the reference signal level on the line 30 as gated by the beam gate 42 and if at the end of an antenna array phase cycle the counter value exceeds about 5% of the scanning beam time, as indicated by the setting of the alarm level count in the store 48, the transmitter shutdown signal is produced on the line 18.

In operation of the equipment it will be appreciated that the phase sensitive detector 19 is required to detect the scanning beam and sidelobe signals. The signal provided on the line 16 from the phase reference generator 17 must therefore be coherent with the scanning beam and sidelobe signals but is not required to be phase matched or phase stable over long periods of time. The phase reference may conveniently be taken from a source within the transmitter 1 or alternatively it may be independently generated.

It will also be appreciated that at the end of each array phase cycle the counter 45 and the sample and hold circuit 36 should be reset.

Figure 3:
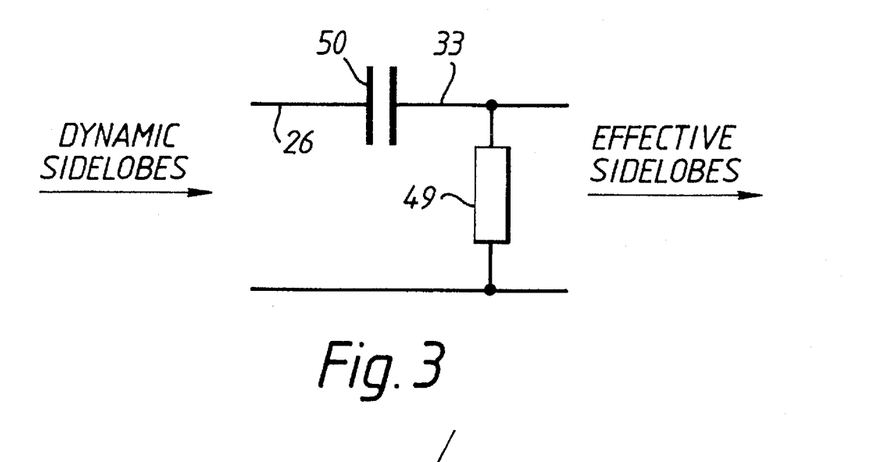
FIG. 3 is a generally schematic block diagram showing an alternative circuit for a part of the equipment shown in FIG. 2.
Figure 4:
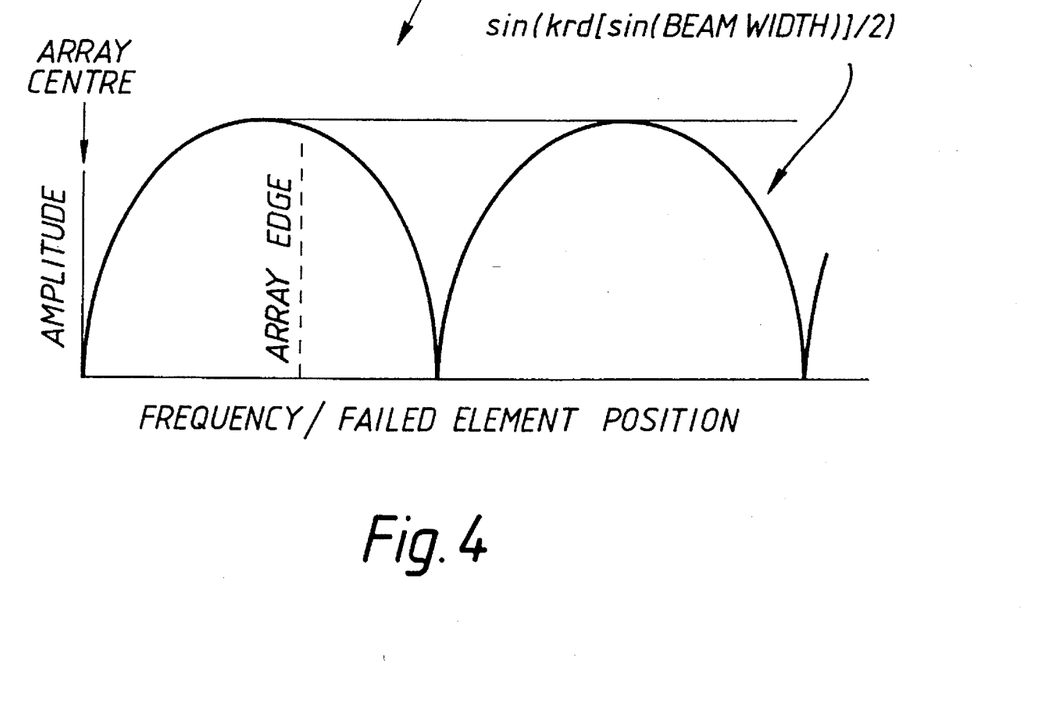
FIG. 4 is a graph illustrating performance of the effective sidelobe filters circuit shown in FIGS. 3 and 2.
Figure 10:
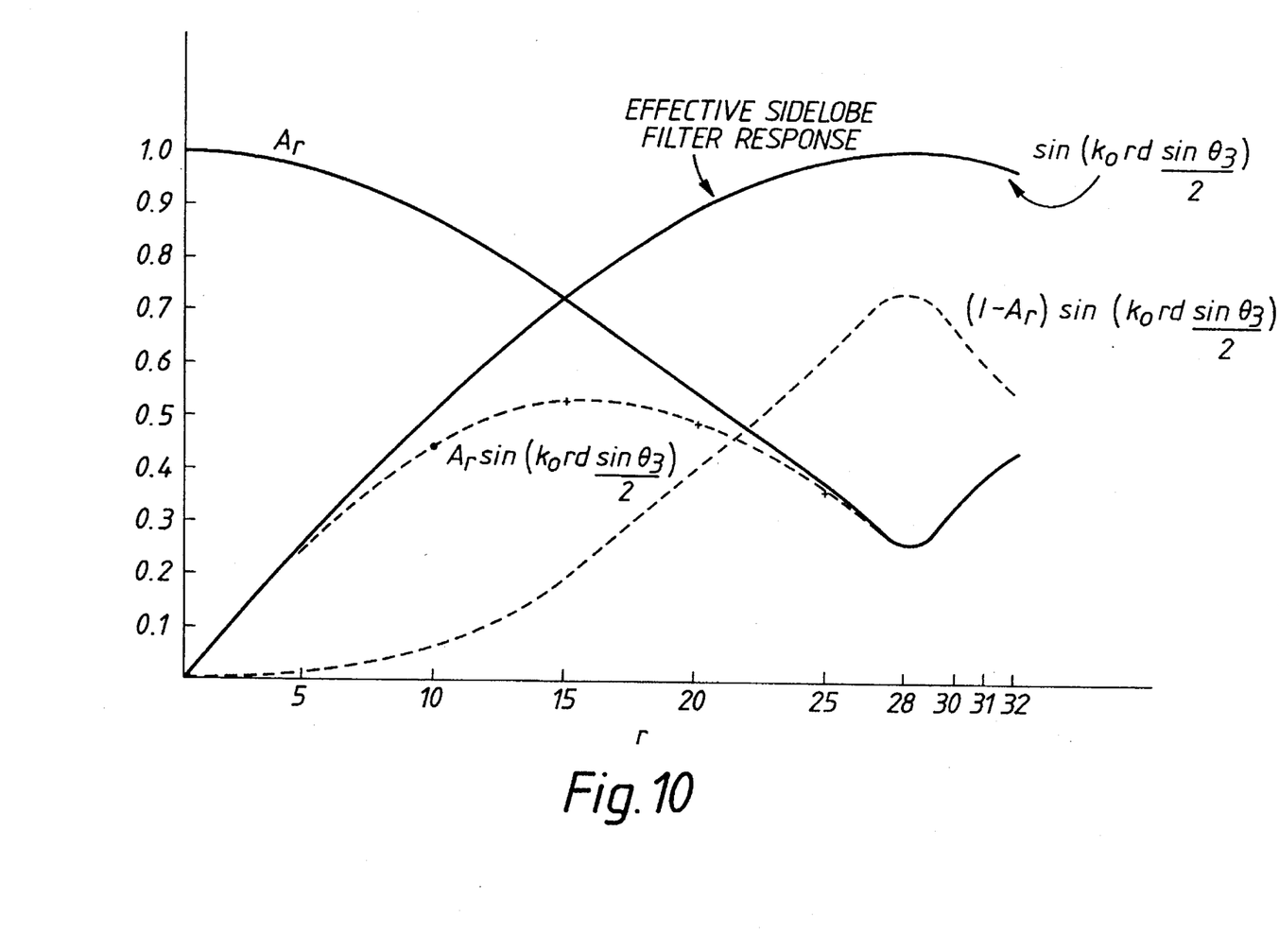
FIG. 10 is a graph showing a filter response illustrating operation of a part of the equipment shown in FIG. 2.

Although an effective sidelobe filter as shown within the broken line 28 and having a response as shown in FIG. 10 is preferably used, an alternative filter arrangement may comprise a differentiating circuit comprising a resistor 49 and a capacitor 50 as shown in FIG. 3, which is connected between the lines 26 and 33. This circuit has a response as shown in the waveform diagram of FIG. 4 which although not as effective as the filter within the broken line 28 shown in FIG. 2, is nevertheless useful in filtering effective sidelobes and for filtering lower frequency components in particular, produced due to phase shifter module failures.

Because the phase of the sidelobes incident on the phase sensitive detector 19 input at the line 14 is varying continuously as the beam is scanning, and at a rate which is related to the effective sidelobes, the sidelobe signal is always present either as an I signal on the line 26 or as a Q signal on the line 27. However, the scanning beam phase is constant during the scanning period, and consequently it may be necessary to adjust the relative phases of the scanning beam and phase reference to ensure that the full scanning beam signal appears at the BI output on line 26 moreover this phase adjustment would need to be fixed and stable throughout the life of the equipment.

However, MLS ground based equipments frequently and preferably employ antenna array phase cycling, ie. all the array phase shifters are incremented prior to each scan or each TO/FRO scan pair, consequently at some time during this phase cycle the scanning beam input to the phase sensitive detector 19 and the phase reference on the line 16 will have the correct phase relationship so as to cause all the scanning beam signal to appear at the I channel output and none at the Q channel output.

Figure 11:
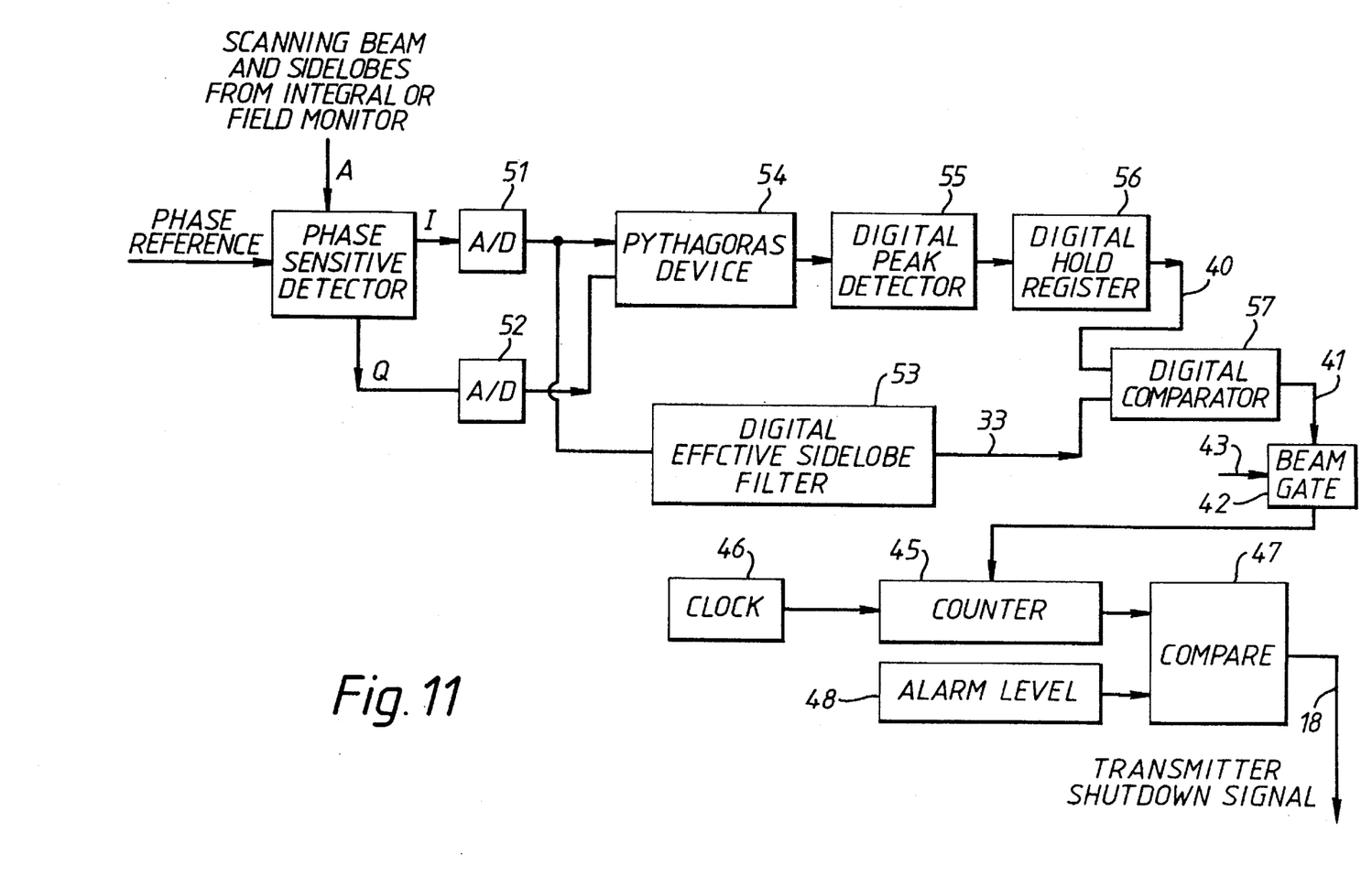
FIG. 11 is a generally schematic block diagram of an alternative arrangement to the part of the equipment shown in FIG. 2.

An alternative implementation of the effective sidelobe filter, beam peak detector, sidelobe reference level and comparator 28, 35, 36, 37, 38, 39 and 34 is shown in FIG. 11. In this method, the I and Q outputs from the PSD are digitised using an analogue to digital converter 51 and 52. The I channel is passed to a digital effective sidelobe filter 53. The I and Q channels are passed to a digital pythagoras device 54 which forms the beam and sidelobe envelope. The output of this device is passed to a digital peak detector 55 and then a hold register 56. The output of the digital effective sidelobe filter 53 is compared with the hold register 56 value in a digital comparator 57 the output of which is the same as 41 in FIG. 2. The remainder of the circuit is the same as FIG. 2.

The theory of operation will now be considered. It is well known, and can be demonstrated, that failures in the centre of the array do not contribute to guidance error through the multipath (effective sidelobes) but do raise the manifold dynamic sidelobes more than any other failure. Consequently, detecting out of tolerance effective sidelobe using the dynamic sidelobes is not acceptable.

Considering firstly guidance error due to array module failure, it can be shown that the beam pointing error due to array module channel failure, amplitude failure (no output or stuck on full output) or phase shifter failure (after integration over an antenna array phase cycle) is given by:

$$d\theta = \theta_3 \frac{E(\theta_R)IRI}{E(\theta)\Sigma A_n} \sum_r^{N^F} \left| A_r^1 \sin\left(k_0 rd \frac{\sin\theta_3}{2}\right) \right| \cdot \quad \text{(Equation 1)}$$

$$\sin(\phi_R - k_0(1 - \cos(\theta + \theta_R))[rd\sin\theta_R + P_a])$$

Where:

$d\theta$=Beam pointing error due to array module channel failure and multipath reflector.

$\theta_3$=Antenna 3 dB beamwidth.

$E(\theta_R)$=Antenna element pattern in the direction of the multipath reflector.

$E(\theta)$=Antenna element pattern in the direction of the receiver.

$\theta_R$=The multipath reflector angle with respect to the antenna array normal.

$P_a$=The range of the multipath reflector from the antenna phase centre.

$\theta$=The receiver angle with respect to the antenna array normal.

IRI=The amplitude of the multipath reflection coefficient.

$\emptyset_R$=The phase of the multipath reflector coefficient.

$A_n$=The amplitude of the nth antenna array radiating element.

$\Sigma A_n$=The sum of all the antenna array radiating element amplitudes.

$A^1_r$=The error amplitude of the rth element. In the case of no output failure, $A^1_r$=Amplitude of unfailed element ($A_r$). In the case of stuck on full output failure $A^1_r = A_r - 1$. In the case of stuck phase shifter, $A^1_r = A_r$.

r=The number of the failed element, N.B. the elements are number 0 to N–1 where N is the total number of array elements (64 for 2 degrees azimuth or 1.5 degrees elevation). Array element number n is: n=0, 1, 2, 3, . . . N–1 r=n–{N–1}/2

$N_F$=The total number of failed elements.

$k_0$=The free space wave number ($2\pi/\lambda_0$).

d=The antenna array element spacing.

It is not possible to know a priori the values of $\emptyset_R$ and $P_a$. Therefore, we must assume that they have values which make:

$$\sin(\emptyset_R - k_0(1-\cos(\theta+\theta_R))\{rd\sin\theta_R + P_a\}) = 1$$

for all values of r, ie. that the reflected signal phase always causes the guidance error to be a maximum.

Then the maximum possible beam pointing error is:

$$d\theta_m = \theta_3 \frac{E(\theta_R)IRI}{E(\theta)\Sigma A_n} \sum_r^{N_F} \left| A_r^1 \sin\left(k_0 rd \frac{\sin\theta_3}{2}\right) \right| \quad \text{(Equation 2)}$$

$d\theta_m$=Maximum value of $d\theta$.

The equation for $d\theta_m$ was derived assuming that the antenna array phases pivot about the array centre.

The following conclusions can be drawn from this equation (2).

(a) If $N_F$=b (A single failure) then $d\theta_m$ is a maximum when $$\left| A_r^1 \sin\left(k_0 rd \frac{\sin\theta_3}{2}\right) \right|$$

is a maximum. This function has been plotted for no output and stuck phase (see FIG. 10). From this plot, we see that the maximum value of $d\theta_m$ is at ¼ or ¾ positions along the array for these two failure modes. The corresponding curve for stuck or full output is $$\left| (A_r^1 - 1)\sin\left(k_0 rd \frac{\sin\theta_3}{2}\right) \right|$$

also shown in FIG. 10.

(b) If $N_F>1$, and is a contiguous block failure, r is continuous, and the failures are at the ¼ or ¾ positions, then $d\theta_m$ is approximately equal to the effective sidelobe allowance for the azimuth array when $N_F=4$.

(c) Symmetrical failures about the centre of the array do not in general cancel to give zero guidance error. Equation (1) shows that they can cancel for particular values of r, $\emptyset_R$ and $P_a$, but since $\emptyset_R$ and $P_a$ are not known, it is not possible to identify those failures which will be cancelled by a similar failure elsewhere in the array.

Considering now integral waveguide monitor (10 in FIG. 1) dynamic sidelobes, it can be shown that the dynamic sidelobe voltage at the integral waveguide monitor output, due to array modules failures, ie. does not include design sidelobes or tolerance sidelobes, is given by:

$$F_I = -A_r^J \exp j \, r_I [d(k_0 \sin\theta_S + \beta) + \pi] \cdot \quad \text{(Equation 3)}$$

$$\left\{ 1 + \sum_{r=r1}^{N_{F}-1} \frac{1}{r2\ r3} \exp j(r-r_1)[d(k_0\sin\theta_S + \beta) + \pi] \right\}$$

When the variable names are defined above, and:

$\theta_S$=The array scan angle.

$\beta$=The integral waveguide propagation coefficient ($2\pi/\lambda g$).

When the failures form a contiguous block, ie. r=1, 2, 3. .. $N_f$–1, then:

$$F_I = -A_r^1 \exp j r_1 [d(k_0 \sin\theta_S + \beta) + \pi] \cdot \quad \text{(Equation 4)}$$

$$\frac{\sin\left(\frac{N_F}{2}[d(k_0\sin\theta_S+\beta)+\pi]\right)}{\sin\left(\frac{d(k_0\sin\theta_S+\beta)+\pi}{2}\right)}$$

We see from the second expression that the failure sidelobes of a contiguous block of array module failures form a failure beam. (The function of the form sinNFx/sinx.)

It can be shown that this failure beam has the following properties:

(a) The peak of the failure beam appears at 10 in FIG. 1 at the same time as the scanning beam. (Beam due to perfect array without failures.)

(b) The failure beamwidth is:

$$\theta_F = 2\sin^{-1}\left[\frac{\lambda_0}{N_Fd}\right]$$

this is the null beamwidth.

(c) The peak voltage level of the failure beam ($V_f$) is:

$$\frac{N_F \overline{A_r^1}}{\Sigma A_n}$$

where $\overline{A^1_r}$ is the average failure amplitude over the $N_F$ elements.

Example:

The worst case failure mode for guidance with no output or stuck phase failure is four failures at the ¼ or ¾ positions. For the Az array:

$N_F$=4, $\overline{A^1}$=0.65, $\Sigma A_n$=39.7

Then $\theta_F$=60 degrees $V_f$=0.0655 or –23.7 dB

For the same example, we can calculate $d\theta_m$ from the equation (2) using the CAA specified reflection coefficient of –3 dB, $E(\theta_R)\approx E(\theta)$ $\theta_3$=2 degrees (azimuth) then:

$d\theta_m$=0.0728 degrees

This does not include the allowance for motion average (0.36 for high rate azimuth). When this is taken into account, the error is 0.0262 degrees. The CAA specification is 0.03 degrees CMN. (NB. The design and tolerance sidelobes will contribute a small additional effective sidelobe error.)

Turning now to a method of sidelobe monitoring in accordance with the present invention, the problem with sidelobe monitoring can be summarised as follows:

Array module failures in the centre of the array cause an increase in monitored dynamic sidelobes, but do not cause an effective sidelobe increase.

The dynamic sidelobe voltage $F_I$ given by equation (3) contains a multiplying phase factor, $\exp j r_1 \{d(k_0 \sin\theta_s + \beta) + \pi\}$ From which we can see that the phase of the dynamic sidelobe caused by a particular failure is changing with scan angle $\theta_S$. The rate of change of phase of the dynamic sidelobe phase is proportional to the distance of the failed array module channel from the array centre (assuming central phase pivoting). Furthermore, symmetrical failures have equal and opposite phase variation with scan.

Consequently, we can use this feature of the dynamic sidelobes to distinguish those dynamic sidelobes caused by failure which are effective sidelobes from those which are not.

Considering now asymmetrical failures and in one specific example, consider a block of four no-output or stuck phase failures at either the ¼ or ¾ array positions. The failure beam phase is:

$r_1\{d(k_0\sin\theta_s+\beta)-\pi\}$

The rate of change of failure beam phase with respect to time is:

$$\omega = \frac{d}{d\sin\theta_S}[r_1(dk_0\sin\theta_S + \beta) + \pi]\cdot$$

$$\frac{d\sin\theta_S}{d\theta_S}\cdot\frac{d\theta_S}{dt} = r_1 dk_0 \cdot \cos\theta_S \cdot V$$

where: V=20,000 degrees per second=349 radians per second $r_1$=16, d=30.5 mm (Azimuth), $k_0=2\pi/\lambda$hd 0$\Delta$ radiant per mm $$\therefore \omega = 16 \times 30.5 \times \frac{2\pi}{60}\cos\theta_S \times 349 =$$

2838.5.2$\pi$ $\cos\theta_S$ radians per second.

The peak of the failure beam is at the same angle as the waveguide manifold beam if $\theta_S=\pm10.5$ degrees:

$\therefore \omega = 2791.2\pi$ radians per second.

$$f = \frac{\omega}{2\pi} = 2791\ \text{Hz}$$
$$= 2.791\ \text{Hz}$$

This is the frequency at the integral monitor beam position. The lowest frequency for these failures will be when $\cos\theta_s$ is a minimum, ie. when $\theta_s$ is a maximum (40 degrees for HAz). Then $f_D$=2.174 KHz but at these wide scan angles, the manifold signal will be in the failure sidelobes not the failure beam.

A similar block of four failures in the centre of the array will have $f_D$=0.

In order to detect the rate of change of phase of the failure sidelobes, it is necessary to use a phase sensitive detector (PSD) to detect the sidelobes.

Either the I or Q channel outputs of the PSD may be used. The output of, say, the Q channel for the above case will be a sinusoidal waveform whose amplitude follows the failure beam and failure sidelobes and whose frequency slowly varies as the beam is scanned. But, most importantly, the output frequency of the failure beam is related to the guidance error caused by the failures in the desired manner, providing the high pass filter has the correct transfer function.

For any single failure on one side of the array, the guidance error function is plotted in FIG. 10 for the extreme forms of failure, ie. no output and full output (stuck phase has the same effect as no output after integration of the sidelobe result over an antenna phase cycle).

The dynamic sidelobe level produced by no output failure is proportional to the amplitude of the failed element $A_r$.

The guidance error is proportional to $$\left| A_r \sin\left( k_0 rd \frac{\sin\theta_3}{2} \right) \right|$$

(equation 2).

In this case, we need to multiply the dynamic sidelobe level by $$\sin\left( k_0 rd \frac{\sin\theta_3}{2} \right).$$

The dynamic sidelobe level produced by full output failure is proportional to $(1-Ar)$, the guidance error is proportional to $$(-Ar) \sin\left( k_0 rd \frac{\sin\theta_3}{2} \right).$$

In this case we need to multiply the dynamic sidelobes level by $$\sin\left( k_0 rd \frac{\sin\theta_3}{2} \right)$$

as before.

In fact, dynamic sidelobes produced by any degree of amplitude error of either sign should be multiplied by $$\sin\left( k_0 rd \frac{\sin\theta_3}{2} \right).$$

This therefore should be the high pass filter transfer function, shown plotted in FIG. 10.

We claim:

1. An MLS system comprising ground equipment which includes a microwave signal transmitter arranged to feed microwave signals to radiator elements of an array antenna via phase shifter modules one of which is provided for each of the said elements, whereby the production of a scanned microwave signal beam is facilitated, a signal monitor/detector receiving said scanned microwave signal beam and providing a detected sample signal derived from the scanned beam, a filter responsive to the detected sample signals and providing a filtered signal derived in dependence upon effective sidelobe signals in the said beam, and a comparator responsive to the filtered signal and providing a transmitter shutdown signal when the filtered signal exceeds a predetermined threshold level for more than a predetermined time during a predetermined number of successive scans.

2. A system as claimed in claim 1, wherein the signal monitor/detector comprises a signal monitor, a phase reference signal generator, and a phase sensitive detector, the phase sensitive detector being responsive to a phase reference signal provided by the said generator and to a sample signal provided by the signal monitor for supplying the said detected sample signal.

3. A system as claimed in claim 1, where the filter comprises a differential amplifier having two input ports and a delay device, which delay device provides a delay corresponding to a period required for the said beam to scan through a sector corresponding to one beam width, the differential amplifier being fed at one port thereof with the detected signal sample direct and being fed at the other port thereof via the delay device with the detected sample signal.

4. A system as claimed in claim 1, wherein the filter comprises a capacitor resistor differentiator circuit.

5. A system as claimed in claim 1, wherein the comparator comprises a first comparator, a peak signal detector responsive to the detected sample signal for providing a threshold reference level signal which defines the said threshold reference level, a counter, and a clock pulse generator, the counter being triggered by the said first comparator to count pulses from the said generator during periods when a signal derived by the peak signal detector exceeds the threshold reference level signal, the count being aggregated during the said predetermined number of successive scans, and the transmitter shutdown signal being produced consequent upon the aggregated count exceeded a predetermined alarm level count.

6. A system as claimed in claim 5, wherein the first comparator is coupled to the counter via a gate operable in dependence upon the scanned beam position for inhibiting signals derived from the main beam and passing signals derived from the sidelobes.

7. A system as claimed in claim 5, wherein the peak signal detector includes a peak beam detector which is responsive to the detected sample signal and which is arranged to feed one port of a two port sample and hold circuit and one port of a two port second comparator, the other port of which second comparator is fed from the peak beam detector via the sample and hold circuit to provide at the output of the second comparator a feedback signal which is fed to the other port of the sample and hold circuit so as to provide the threshold reference level signal.

8. A system as claim in claim 7, wherein the comparator of claim 1 comprises a third comparator responsive to the count state of the counter for providing the transmitter shutdown signal when the said count state exceeds the said alarm level count.

9. A system as claimed in claim 1, wherein the ground based equipment is used for the purposes of providing a beam which scans in azimuth and similar equipment may be provided which produces a beam which scans in elevation.

* * * * *